United States Patent
Itoigawa et al.

(10) Patent No.: US 6,895,643 B2
(45) Date of Patent: May 24, 2005

(54) BUCKLE DEVICE

(75) Inventors: Kouichi Itoigawa, Aichi-ken (JP); Masakata Kanbe, Aichi-ken (JP); Tetsushi Muromachi, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 62 days.

(21) Appl. No.: 10/670,800

(22) Filed: Sep. 26, 2003

(65) Prior Publication Data

US 2004/0111846 A1 Jun. 17, 2004

(30) Foreign Application Priority Data

Sep. 27, 2002 (JP) ........................................ 2002-284157

(51) Int. Cl.7 ........................... A44B 11/26; B60R 22/48
(52) U.S. Cl. ......................................... 24/633; 24/641
(58) Field of Search ........................ 24/633, 640, 641, 24/636; 180/268, 269, 270; 280/801.1; 297/468

(56) References Cited

U.S. PATENT DOCUMENTS

| | | | |
|---|---|---|---|
| 5,742,986 A | | 4/1998 | Corrion et al. |
| 5,871,063 A | * | 2/1999 | Young ........................... 24/641 |
| 5,944,135 A | | 8/1999 | Blackburn et al. |
| 6,076,239 A | * | 6/2000 | Kopetzky et al. .............. 24/633 |
| 6,079,744 A | * | 6/2000 | Husby et al. ................... 24/633 |
| 6,082,481 A | * | 7/2000 | Engler ............................ 24/633 |
| 6,205,629 B1 | * | 3/2001 | Becker ........................... 24/633 |
| 6,357,091 B1 | * | 3/2002 | Devereaux ..................... 24/633 |
| 6,381,815 B1 | | 5/2002 | Yamaguchi et al. |
| 6,389,661 B1 | * | 5/2002 | Brown et al. .................. 24/633 |
| 6,474,435 B1 | * | 11/2002 | Devereaux ..................... 24/633 |
| 6,729,427 B1 | * | 5/2004 | Do ............................... 180/268 |
| 6,742,229 B2 | * | 6/2004 | Kanbe et al. ................... 24/633 |

FOREIGN PATENT DOCUMENTS

| | | |
|---|---|---|
| JP | 2002-157603 A | 6/2001 |
| JP | 2001-260817 A | 9/2001 |

* cited by examiner

Primary Examiner—Robert J. Sandy
(74) Attorney, Agent, or Firm—Nixon Peabody LLP

(57) ABSTRACT

A buckle device including: a device main body into which is inserted a tongue plate provided at a webbing belt; a locking mechanism having a latch which is provided within the device main body so as to be engageable with the tongue plate when the tongue plate is inserted in the device main body, the locking mechanism restricting pulling-out of the tongue plate; a first detecting mechanism detecting the tongue plate which has been inserted in the device main body, and outputting a first detection signal; a second detecting mechanism detecting a position of the latch, and outputting a second detection signal; and a judging mechanism connected to the first detecting mechanism and the second detecting mechanism.

20 Claims, 11 Drawing Sheets

BUCKLE DEVICE

CROSS-REFERENCE TO RELATED APPLICATION

This application claims priority under 35 USC 119 from Japanese Patent Application No. 2002-284157, the disclosure of which is incorporated by reference herein.

BACKGROUND OF THE INVENTION

1. Field of the Invention

The present invention relates to a buckle device which structures a seat belt device of a vehicle and which is for holding a tongue plate attached to a webbing belt.

2. Description of the Related Art

One longitudinal direction end of a webbing belt, which structures a seat belt device for restraining the body of a vehicle occupant seated in a seat of a vehicle, is anchored on a take-up shaft of a take-up device which is provided, for example, at the side of the seat. The other end of the webbing belt is fixed to an anchor plate which is provided in a vicinity of the take-up device. Moreover, the longitudinal direction intermediate portion of the webbing belt passes through a through-hole of a through anchor which is provided above the take-up device (e.g., at the upper end side of the center pillar of the vehicle), and is folded over backward downwardly.

The portion of the webbing belt between the folded-over portion at the through anchor and the other end passes through a through-hole formed in a tongue plate. By pulling the tongue plate, the webbing belt, which is taken-up on the take-up shaft of the take-up device, is pulled out. The webbing belt is set in a state of being applied to a vehicle occupant by, in the state in which the webbing belt is pulled-out, inserting the tongue plate in and connecting the tongue plate to a buckle device which is provided at the side of the seat opposite the side at which the take-up device is provided.

Moreover, an ejector is provided at the buckle device on the locus of movement of the tongue plate within the buckle device. The ejector is urged in the direction opposite to the direction of insertion of the tongue plate into the buckle device, by an urging mechanism such as a compression coil spring or the like. When the tongue plate is inserted in the buckle device, the ejector is pushed by the tongue plate and moves against the urging force of the urging mechanism. When the mechanical connection between the buckle device and the tongue plate is released in order to cancel the applied state of the webbing belt, the urging mechanism pushes the tongue plate by the urging force of the urging mechanism and via the ejector, so as to make the tongue plate come out from the buckle device.

There are buckle devices having a structure which is provided with a so-called "buckle switch" (see, for example, Japanese Patent Application Laid-Open (JP-A) No. 2001-157603).

The buckle device, which is provided with the buckle switch and is disclosed in the aforementioned document, is equipped with a lock pin which interlocks with a latch. The buckle device has a magnet which interlocks with the lock pin. Fluctuations in a magnetic field due to movement of the magnet which is interlocked with movement of the lock pin at the time when the latch moves to a position of engaging with the tongue plate, are detected by a Hall element. On the basis of the results of detection, for example, a warning light provided at the instrument panel of the vehicle is lit so that the vehicle occupant is urged to apply his/her webbing belt.

The above-described buckle switch is a structure which detects that the tongue plate, which is inserted in the buckle device, has pushed the ejector and the latch has moved. Thus, even if some external force is applied to the latch or another member such that the latch moves even though the tongue plate has not been inserted, the buckle switch will carry out the same output as in the case in which the latch engages with the tongue plate.

Namely, buckle switches heretofore cannot detect whether or not the latch is actually engaged with the tongue plate. Therefore, it cannot be said that attachment of the tongue plate to the buckle device is detected, and there is still room for improvement. A buckle device having a mechanism which can reliably detect the attachment of the tongue plate is desired.

SUMMARY OF THE INVENTION

In view of the aforementioned, an object of the present invention is to provide a buckle device which can reliably detect the attachment of a tongue plate.

A first aspect of the present invention provides a buckle device comprising: a device main body into which is inserted a tongue plate provided at a webbing belt; a locking mechanism having a latch which is provided within the device main body so as to be movable between an engagement position, at which the latch engages with the tongue plate which has been inserted in the device main body, and an engagement released position, at which the latch does not engage with the tongue plate, wherein when the latch moves to the engagement position, the latch engages with the tongue plate and restricts pulling-out of the tongue plate from the device main body; a first detecting mechanism detecting the tongue plate which has been inserted in the device main body, and outputting a first detection signal in a state in which the first detecting mechanism detects at least the tongue plate; a second detecting mechanism selected from one of directly or indirectly detecting the latch which is positioned at either one of the engagement position and the engagement released position, and outputting a second detection signal in a state in which the second detecting mechanism detects at least the latch; and a judging mechanism connected to the first detecting mechanism, and, on the basis of the first detection signal from the first detecting mechanism, judging whether or not the tongue plate has been inserted in the device main body, and connected to the second detecting mechanism, and, on the basis of the second detection signal from the second detecting mechanism, judging whether the latch is positioned at the engagement position or the engagement released position.

In accordance with the buckle device having the above-described structure, the tongue plate, which is attached to the webbing belt which forms the seat belt device, is inserted in the device main body. In this state, when the latch of the locking mechanism provided in the device main body moves from the engagement released position to the engagement position and the latch engages with the tongue plate, pulling-out of the tongue plate from the device main body is restricted by the latch. In this way, in this state, if the webbing belt is applied to the body of a vehicle occupant for example, the body of the vehicle occupant is held by the webbing belt.

On the other hand, when the tongue plate is inserted in the device main body as described above, the tongue plate is detected by the first detecting mechanism, and a predetermined first detection signal is outputted from the first detecting mechanism. The first detection signal outputted from the first detecting mechanism is inputted to a control mechanism. At the control mechanism, due to the predetermined first detection signal being inputted (i.e., on the basis of the first detection signal), it is judged that the tongue plate is inserted in the device main body.

Accordingly, on the basis of the results of judgment, it can be detected whether or not the tongue plate is inserted in the device main body.

Further, in the present buckle device, when the latch is positioned at either one of the engagement position and the engagement released position, the latch is detected directly or indirectly by the second detecting mechanism. Further, when the second detecting mechanism detects the latch, a predetermined second detection signal is outputted from the second detecting mechanism. The second detection signal outputted from the second detecting mechanism is inputted to the judging mechanism.

Here, when the latch moves from the engagement released position to the engagement position, the latch is detected by the second detecting mechanism, or detection of the latch by the second detecting mechanism is canceled. Therefore, due to the state changing from one of a state of detection of the latch by the second detecting mechanism and a state of cancellation of detection of the latch to the other state, movement of the latch from the engagement released position to the engagement position is detected and the predetermined second detection signal is outputted from the second detecting mechanism, or output of the predetermined second detection signal is canceled (i.e., output of the second detection signal is stopped, or the second detection signal is outputted but the signal level or the like is different than a predetermined level).

Therefore, at the judging mechanism, it is judged whether or not the latch has moved from the engagement released position to the engagement position due to changes in or stoppage of the second detection signal outputted from the second detecting mechanism (i.e., on the basis of the second detection signal).

In this way, in the present buckle device, the insertion of the tongue plate into the device main body is detected by the first detecting mechanism, and movement of the latch is detected by the second detecting mechanism. Accordingly, on the basis of the results of judgment at the judging mechanism which are based on the respective results of detection of the first and second detecting mechanism, it can be detected whether or not the latch has engaged with the tongue plate inserted in the device main body, i.e., whether or not the latch has locked the tongue plate.

Further, in the first aspect, the locking mechanism has a restricting member, and the restricting member is provided at an interior of the device main body so as to be interlockingly movable with the latch so as to move from an abutment canceled position, at which the restricting member does not abut the latch, to an abutment position, at which the restricting member abuts the latch, when the latch moves from the engagement released position to the engagement position, and in a state in which the restricting member has moved to the abutment position, the restricting member abuts the latch which has moved to the engagement position, and restricts movement of the latch to the engagement released position.

Moreover, the second detecting mechanism has a restricting member detecting mechanism which detects the restricting member positioned at either one of the abutment canceled position and the abutment position, and which outputs a predetermined detection signal in a state in which the restricting member detecting mechanism detects at least the restricting member.

In accordance with the buckle device having the above-described structure, when the latch moves from the engagement released position to the engagement position, interlockingly with this movement of the latch, the restricting member moves from the abutment canceled position to the abutment position. In the state in which the restricting member has moved to the abutment position, the restricting member abuts the latch. In this state of abutment, when the latch attempt to move from the engagement position to the engagement released position, the restricting member interferes with the latch. In this way, movement of the latch to the engagement released position is restricted, and it is possible to prevent the locking of the tongue plate by the latch from being inadvertently released.

On the other hand, in the present buckle device, when the restricting member is positioned at either one of the abutment position and the abutment canceled position, the restricting member is detected by the restricting member detecting mechanism which serves as the second detecting mechanism. Accordingly, when the restricting member moves from the abutment canceled position to the abutment position, the restricting member is detected by the restricting member detecting mechanism, or detection of the restricting member by the restricting member detecting mechanism is canceled.

Moreover, in the state in which the restricting member detecting mechanism detects the restricting member, a predetermined detection signal serving as the second detection signal is outputted from the restricting member detecting mechanism. The detection signal outputted from the restricting member detecting mechanism is inputted to the judging mechanism.

Here, the movement of the restricting member from the abutment canceled position to the abutment position is interlocked with movement of the latch from the engagement released position to the engagement position. Therefore, due to the state changing from one of the state of detection of the restricting member by the restricting member detecting mechanism and the state in which detection of the restricting member is canceled to the other state, movement of the latch from the engagement released position to the engagement position is detected indirectly.

Further, the first detecting mechanism has: a permanent magnet provided at a side of a locus of movement of the tongue plate within the device main body, an orientation of magnetic poles of the permanent magnet running along a direction of movement of the tongue plate within the device main body; and a magnetic sensor detecting magnetism of the permanent magnet, and outputting the first detection signal on the basis of changes in detected magnetism.

Moreover, the tongue plate is formed by a magnetic body, and the first detecting mechanism is disposed at a side of the tongue plate which is inserted in the device main body.

In the buckle device of the above-described structure, a permanent magnet forming the first detecting mechanism is provided within the device main body. A magnetic field is formed around the permanent magnet. The polarity of the permanent magnet runs along the direction of movement of the tongue plate within the device main body (i.e., the north pole is oriented in one direction of movement of the tongue plate within the device main body, and the south pole is oriented in the other). Therefore, when the tongue plate which is formed of a magnetic body is inserted in the device main body, the line of magnetic force forming the magnetic field attempts to pass through the tongue plate which is formed of a magnetic body having a higher magnetic permeability than air. In this way, the magnetic field formed around the permanent magnet changes, and the orientation of at least one portion of the line of magnetic force forming the magnetic field changes.

In this way, due to the magnetic field changing, the magnetism which is detected by the magnetic sensor, which together with the permanent magnet forms the first detecting mechanism, changes. The first detection signal outputted from the magnetic sensor thereby changes. At the judging mechanism, due to this change in the first detection signal, it is judged (detected) whether or not the tongue plate is inserted in the device main body.

Further, in the first aspect, the second detecting mechanism includes: a permanent magnet provided within the device main body, and moving one of integrally with and interlockingly with movement of the latch; and a magnetic sensor provided at a side of the permanent magnet in a state in which the latch is positioned at one of the engagement position and the engagement released position, the magnetic sensor detecting magnetism of the permanent magnet and outputting the second detection signal which is based on changes in detected magnetism.

In the buckle device having the above-described structure, when the latch moves, the permanent magnet, which structures the second detecting mechanism, moves either integrally with or interlockingly with the latch. Accordingly, the magnetic field formed by the permanent magnet changes with respect to the device main body.

In contrast, the magnetic sensor is provided at the side of the permanent magnet in the state in which the latch is positioned at the engagement position or the engagement released position. The magnetism of the permanent magnet is detected by the magnetic sensor.

Accordingly, when the permanent magnet moves due to the latch moving as described above, the magnetic field at the engagement position and the engagement released position changes. Therefore, the magnetism detected by the magnetic sensor also changes. The second detection signal is outputted from the magnetic sensor on the basis of the detected magnetism. Therefore, as described above, when the magnetism detected by the magnetic sensor changes, the second detection signal changes. Due to this change in the second detection signal, the judging mechanism judges (detects) whether or not the latch has moved from the engagement released position to the engagement position.

Further, the magnetic sensor structuring the first detecting mechanism is formed by a magnetoresistive element.

Moreover, the magnetic sensor structuring the second detecting mechanism is formed by a magnetoresistive element.

In the buckle device having the above-described structure, the magnetic sensor structuring at least either one of the first detecting mechanism and the second detecting mechanism is a giant magnetoresistive element. Here, in the case of a usual magnetoresistive element, the rate of change in electrical resistance at the time when a magnetic field is applied is several percent. However, in the case of a giant magnetoresistive element, the rate of change in electrical resistance at the time when a magnetic field is applied rises to several ten percent. Thus, even if the change in the magnetism of the magnetic field formed by the permanent magnet is small, the change in the signal level outputted from the magnetic sensor can be made to be large, and insertion of the tongue plate into the device main body and movement of the latch can be reliably detected.

Further, the buckle device further comprises a substrate to which both the first detecting mechanism and the second detecting mechanism are mounted.

In the buckle device having the above-described structure, both of the first detecting mechanism and the second detecting mechanism are mounted to the substrate. Therefore, to mount the first detecting mechanism and the second detecting mechanism to the device main body, it suffices to mount the substrate to the device main body. In this way, the number of processes for assembling parts to the device main body can be reduced.

Moreover, electrical current is always made to flow to electrical circuits including the first detecting mechanism and the second detecting mechanism.

In the buckle device having the above-described structure, usually, for example, even in a state in which the engine of the vehicle is stopped or a state in which the ignition key is removed from the key cylinder, electrical current flows to the electrical circuits including the first detecting mechanism and the second detecting mechanism. Accordingly, basically, by sensing that electrical current is not flowing to these electrical circuits, it can be judged that an abnormality has arisen in one of the electrical circuits. In this way, in the present buckle device, it can be judged at an early stage whether or not the first detecting mechanism and the second detecting mechanism are operating normally.

In the present buckle device, provided that a structure is used in which electrical current always flows to the electrical circuits including the first detecting mechanism and the second detecting mechanism, the electrical current levels thereof are not limited. Moreover, as described above, abnormalities in the electrical circuits can be judged by making electrical current always flow to the electrical circuits. However, the abnormality judging mechanism for judging abnormalities is not limited to a specific aspect.

A second aspect of the present invention provides a buckle device comprising: a device main body into which is inserted a tongue plate provided at a webbing belt; a locking mechanism having a latch which is provided within the device main body so as to be movable to a position at which the latch can engage with the tongue plate when the tongue plate is inserted in the device main body, the locking mechanism restricting pulling-out of the tongue plate from the device main body; a first detecting mechanism detecting the tongue plate which has been inserted in the device main body, and outputting a first detection signal; a second detecting mechanism detecting a position of the latch, and outputting a second detection signal; and a judging mechanism connected to the first detecting mechanism and the second detecting mechanism, wherein on the basis of the first detection signal, the judging mechanism judges whether or not the tongue plate is inserted in the device main body, and on the basis of the second detection signal, the judging mechanism judges whether or not the latch is engaged with the tongue plate.

DETAILED DESCRIPTION OF THE INVENTION

Structure of the Present Embodiment

Figure 1:
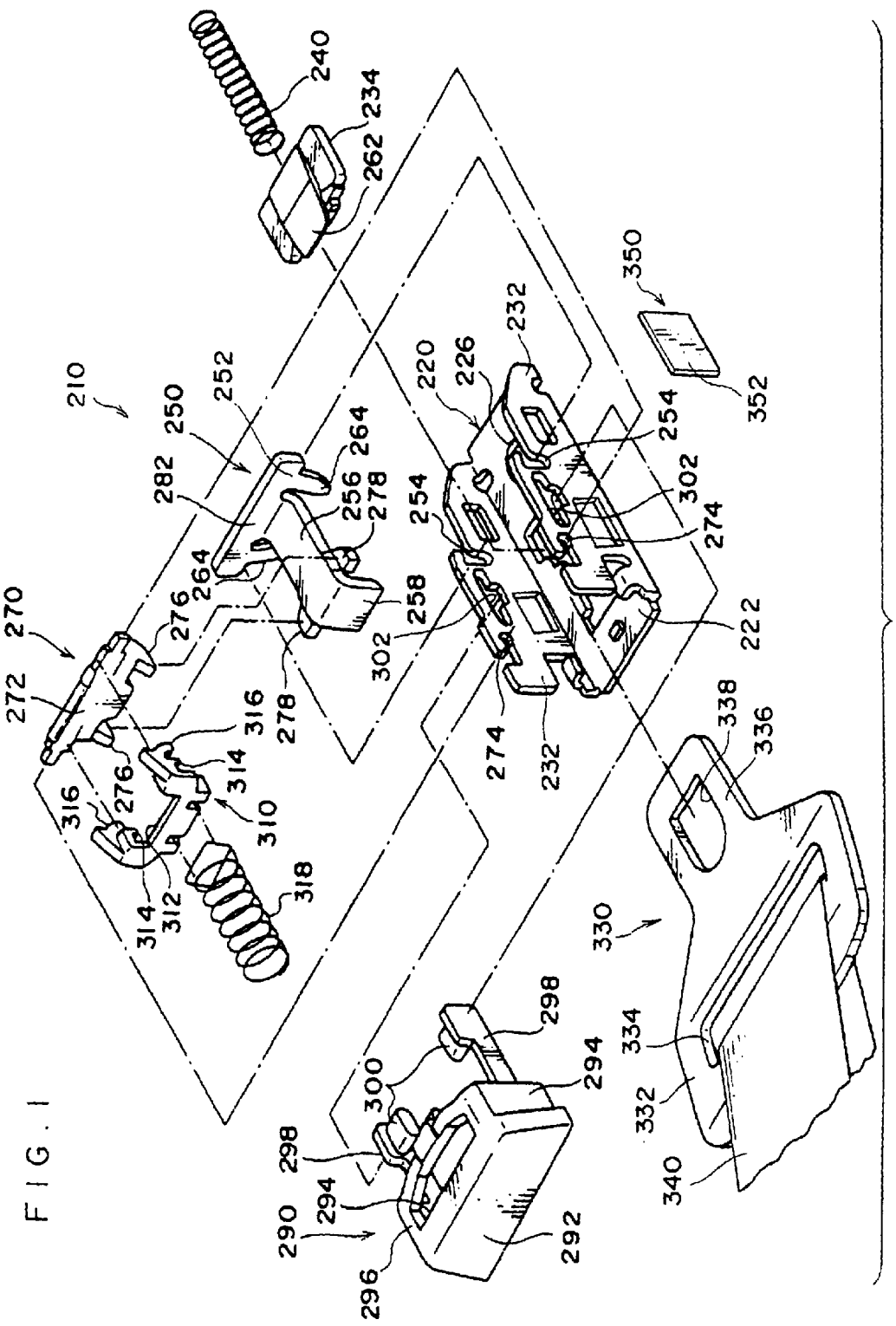
FIG. 1 is an exploded perspective view showing the structure of a buckle device relating to an embodiment of the present invention.

The structure of a buckle device 210 relating to an embodiment of the present invention is shown in exploded perspective view in FIG. 1. The structure of the buckle device 210 is shown in sectional view in FIG. 3.

Overall Structure of Buckle Device 210

Figure 3:
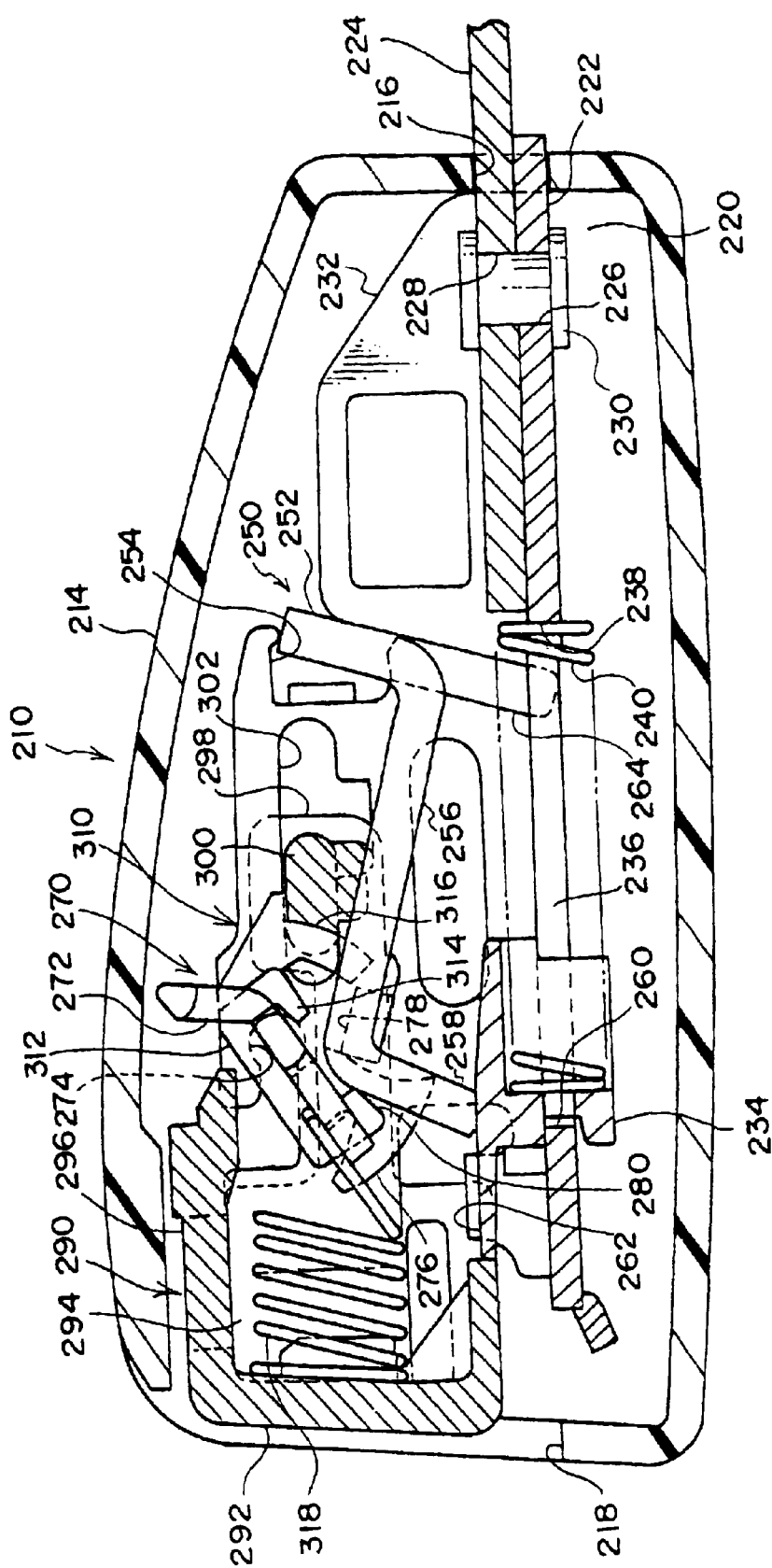
FIG. 3 is a side sectional view of the buckle device relating to the embodiment of the present invention.

As shown in FIG. 3, the buckle device 210 has a case 214 serving as a device main body. The case 214 is formed as a box-shaped tubular member whose both longitudinal direction ends are open. The opening at one longitudinal direction end of the case 214 is an anchor insertion opening 216, whereas the opening at the other longitudinal direction end side is a tongue plate insertion opening 218. A base 220, which together with the case 214 structures the device main body, is housed within the case 214.

The base 220 has a floor wall 222. The floor wall 222 is formed in the shape of a flat plate whose longitudinal direction is the longitudinal direction of the case 214. A substantially plate-shaped anchor plate 224 is superposed on one longitudinal direction end side of the floor wall 222. The floor wall 222 and the anchor plate 224 are mechanically connected by a rivet 230 which passes through a through-hole 226 formed in the floor wall 222 and a through-hole 228 formed in the anchor plate 224. The other end side of the anchor plate 224 is fixed to the vehicle body at the side of the seat of the vehicle. (Neither the vehicle body nor the seat is illustrated.) The present buckle device 210 is thereby mounted to the vehicle.

On the other hand, side walls 232 stand upright in the direction of thickness of the floor wall 222 from both transverse direction end portions of the floor wall 222. An ejector 234 is disposed between these side walls 232. One portion of the ejector 234 is engaged with a guide hole 236 formed in the floor wall 222, such that the ejector 234 can slide over a predetermined range in the longitudinal direction of the floor wall 222 along the guide hole 236.

Figure 2:
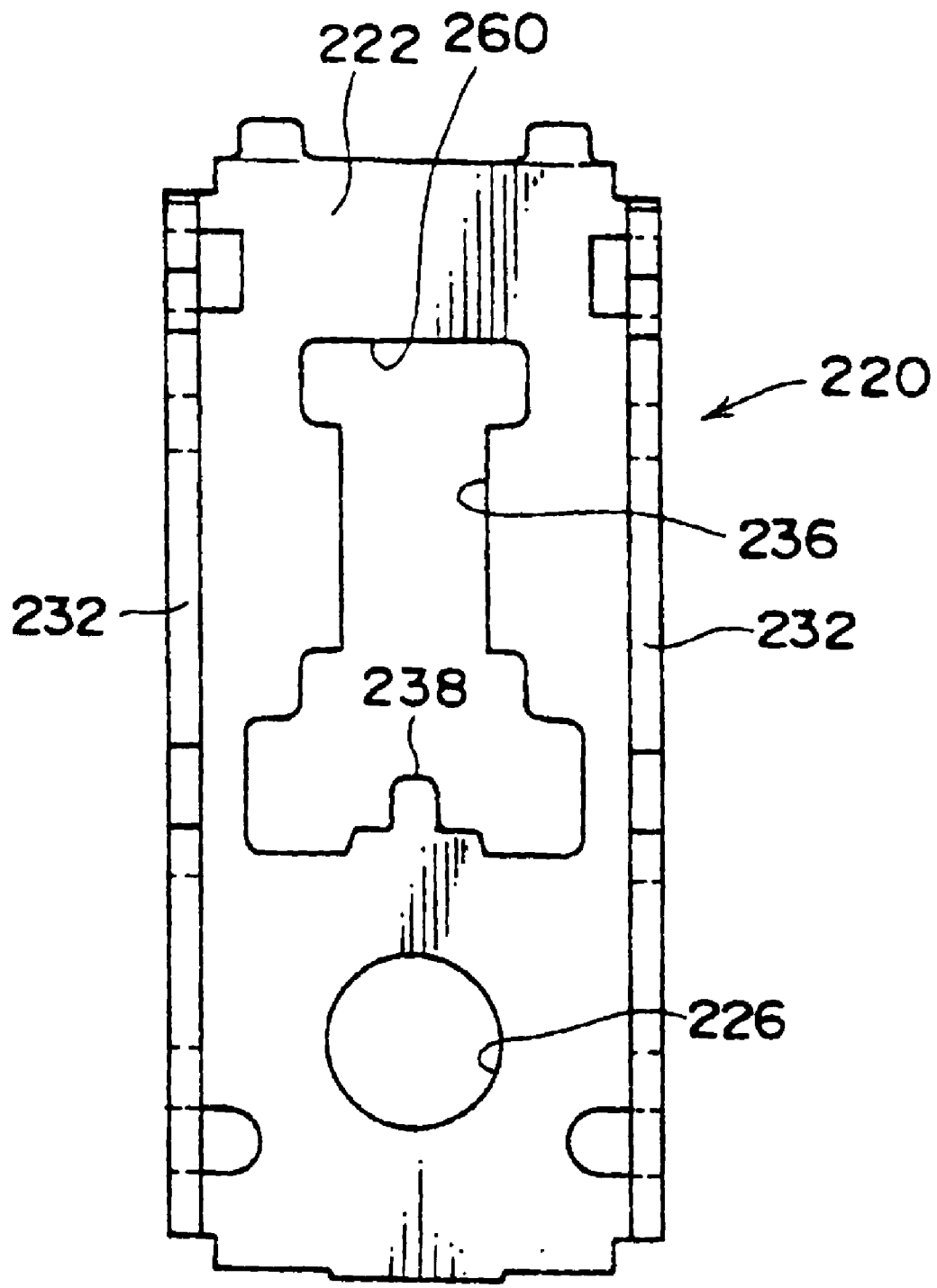
FIG. 2 is a reverse view of a base of the buckle device relating to the embodiment of the present invention.

Further, as shown in FIG. 2, an engaging projection 238 is formed to project from an end portion of the guide hole 236 at one side of the floor wall 222. One end of a compression coil spring 240 is anchored on this engaging projection 238. The other end of the compression coil spring 240 is pressed to contact one end of the ejector 234. The ejector 234 is urged toward the other longitudinal direction end side of the floor wall 222 by the urging force of the compression coil spring 240.

On the other hand, as shown in FIGS. 1 and 3, the buckle device 210 has a latch 250 which structures a locking mechanism. The latch 250 has a base portion 252. The base portion 252 is formed in the shape of a flat plate whose longitudinal direction is approximately the direction opposing the both side walls 232 and whose thickness direction is the longitudinal direction of the floor wall 222, although it depends on the posture of the latch 250 as well. The direction orthogonal to both the longitudinal direction and the thickness direction is the transverse direction. The both longitudinal direction end portions of the base portion 252 are disposed in hole portions 254 formed in the side walls 232. The hole portions 254 are formed in taper shapes whose inner widths gradually broaden toward the side opposite the floor wall 222. The base portion 252 (i.e., the latch 250) is supported so as to be able to move in the longitudinal direction of the base portion 252 and so as to be able to rotate over a predetermined angle with the longitudinal direction of the base portion 252 being the axial direction, until it is interfered with by the inner peripheral portions of the hole portions 254.

A flat plate shaped connecting portion 256 extends toward one side in the transverse direction of the base portion 252, from one transverse direction end at the longitudinal direction intermediate portion of the base portion 252. Moreover, an engaging piece 258 extends toward the floor wall 222 from the side of the connecting portion 256 opposite the side at which the base portion 252 is provided. The distal end portion of the engaging piece 258 (more specifically, the end portion at the side opposite the side connected with the connecting portion 256) corresponds to a through-hole 260 formed in the floor wall 222. The engaging piece 258 can enter into the through-hole 260 due to the latch 250 being displaced from an engagement released position, which is the initial position of the latch 250 and is shown in FIG. 3, to an engagement position shown in FIG. 4.

A placement piece 262 is provided integrally at the surface of the ejector 234 at one side in the direction of thickness thereof (the side opposite the floor wall 222) at the ejector 234 so as to correspond to the distal end portion of the engaging piece 258 of the latch 250. As described above, the urging force of the compression coil spring 240 acts on the ejector 234. However, the placement piece 262 is provided so as to approximately oppose the distal end portion of the engaging piece 258 along the direction of thickness of the floor wall 222, in the state (see FIG. 4) in which the ejector 234 is positioned at its arrival position in a state in which basically no external force (other than the urging force of the compression coil spring 240) is being applied thereto. In the state in which the placement piece 262 opposes the distal end portion of the engaging piece 258, the placement piece 262 interferes with the distal end portion of the engaging piece 258 and restricts movement of the engaging piece 258 in the direction of approaching the floor wall 222 (i.e., restricts movement of the latch 250).

Moreover, stoppers 264 extend from both longitudinal direction end sides of the base portion 252. The distal end sides of the stoppers 264 are formed so as to be positioned on the locus of sliding of the ejector 234 against the urging force of the compression coil spring 240. Namely, when the ejector 234 slides a predetermined distance against the urging force of the compression coil spring 240, the ejector 234 abuts the stoppers 264.

On the other hand, a lock member 270, which serves as a restricting member, is disposed at the side of the connecting portion 256 opposite the floor wall 222 side thereof. The lock member 270 has a base portion 272. The base portion 272 is shaped as a substantially rectangular rod whose longitudinal direction is the direction of opposing the side walls 232.

The end portions of the base portion 272 are disposed in engagement holes 274 formed in the side walls 232. The engagement holes 274 are formed further toward the longitudinal direction other end side of the side walls 232 than the through-hole 260. The base portion 272 is supported at the side walls 232 so as to be rotatable, with its own longitudinal direction being the axis of rotation. A pair of substantially fan-shaped lock pieces 276 are formed at the longitudinal direction end sides of the base portion 272.

The lock pieces 276 are formed so as to correspond to abutment pieces 278 which extend out from both transverse direction end portions of the connecting portion 256 of the latch 250. Due to the latch 250 moving to the engagement position and the lock member 270 moving from an abutment canceled position shown in FIG. 3 to an abutment position shown in FIG. 4, the lock pieces 276 abut the abutment pieces 278 from above. Further, at the lock member 270 having the lock pieces 276, at least the lock piece 276, which is positioned at the side of a latch detecting portion 372 which will be described later, is formed by a permanent magnet, so as to form a predetermined magnetic field at the periphery thereof.

Further, an abutment portion 280 is formed at the longitudinal direction intermediate portion of the base portion 272. The abutment portion 280 abuts the engagement piece 258 of the latch 250 in the state (see FIG. 4) in which the engagement piece 258 is apart from the floor wall 222.

On the other hand, as shown in FIGS. 1 and 3, the buckle device 210 has a release button 290. The release button 290 has a press portion 292 for operation. The press portion 292 is shaped as a plate whose press surface is directed toward the longitudinal direction other end side of the floor wall 222. The longitudinal direction of the press surface is the direction of opposing the side walls 232.

Side walls 294 extend toward the one longitudinal direction end side of the floor wall 222 from vicinities of both longitudinal direction ends of the press portion 292. The side walls 294 oppose one another along the direction of opposing the side walls 232. The end portions of the side walls 294 at the side opposite the floor wall 222 are connected by a top wall 296. The release button 290 on the whole is a concave configuration which opens toward the floor wall 222.

Arms 298 extend, so as to oppose one another along the direction of opposing the side walls 294, from the end portions of the side walls 294 opposite the side at which the press portion 292 is provided. Engaging projections 300 are formed at the distal end portions of the arms 298 so as to be directed toward the other arms 298.

These engaging projections 300 are disposed in guide holes 302 formed in the side walls 232. The guide holes 302 are long holes whose longitudinal direction runs along the longitudinal direction of the floor wall 222. The engaging projections 300 are displaceable over a predetermined range along the longitudinal direction of the floor wall 222, by the inner peripheral portions of the guide holes 302. In this way, the direction of movement of the release button 290 is restricted by the guide holes 302 to the longitudinal direction of the floor wall 222.

A stopper 310 is disposed between the press portion 292 and the lock member 270. The stopper 310 has a plate-shaped base portion 312 whose longitudinal direction is the direction in which the side walls 294 oppose one another.

A pair of engaging pieces 314, which are concave configurations opening toward the floor wall 222 when viewed along the longitudinal direction of the base portion 312, are formed at the longitudinal direction both end sides of the base portion 312. The stopper 310 is supported at the lock member 270 by these engaging pieces 314 engaging with the base portion 272 of the lock member 270.

Interfering portions 316, which can interfere with the engaging projections 300 of the release button 290, are formed in the vicinities of the engaging pieces 314 of the stopper 310.

A compression coil spring 318 is disposed between the stopper 310 and the press portion 292 of the release button 290. One end of the compression coil spring 318 abuts the side of the press portion 292 opposite the press surface side thereof. The other end of the compression coil spring 318 abuts the base portion 312 of the stopper 310. The compression coil spring 318 urges the stopper 310 in a direction of moving away from the press portion 292.

Structure of Tongue Plate 330

On the other hand, a tongue plate 330 is inserted between the side walls 232 from the longitudinal direction other end side of the floor wall 222. As shown in FIG. 1, the tongue plate 330 is provided with a base portion 332 which is formed by a metal plate. A slit 334, whose longitudinal direction is the direction of opposing the side walls 232 in the state in which the tongue plate 330 is inserted between the side walls 232, is formed in the base portion 332. The longitudinal direction intermediate portion of an elongated, strip-shaped webbing belt 340 is inserted through the slit 334.

An insertion plate portion 336 is formed at the base portion 332. The transverse dimension of the insertion plate portion 336 is smaller than the interval between the side walls 232. In actuality, the insertion plate portion 336 is the portion of the tongue plate 330 which is inserted between the side walls 232.

A through-hole 338, which passes through in the direction of thickness of the insertion plate portion 336, is formed in the insertion plate portion 336. The engaging piece 258 can pass through the through-hole 338 in the state in which the insertion plate portion 336 has reached a predetermined position of the one longitudinal direction end side of the floor wall 222 between the side walls 232. Pulling-out of the tongue plate 330 from the buckle device 210 is restricted due to the engaging piece 258 passing through the through-hole 338.

Structure of Lock Detecting Device 350

Figure 9:
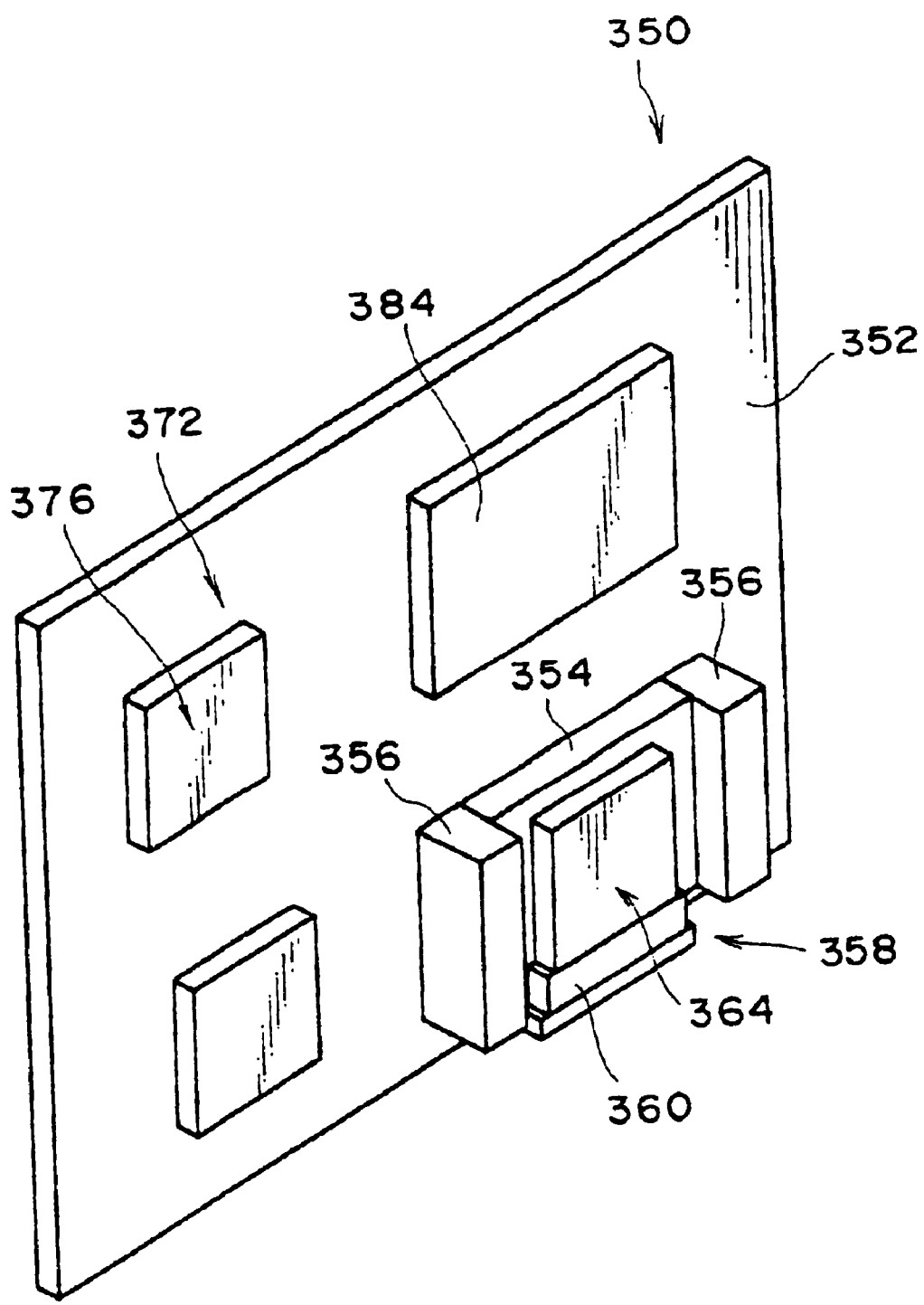
FIG. 9 is a schematic perspective view of a lock detecting device having a first detecting mechanism and a second detecting mechanism relating to the embodiment of the present invention.

As shown in FIG. 1, the present buckle device 210 has a lock detecting device 350. As shown in FIG. 9, the lock detecting device 350 has a circuit board 352. The circuit board 352 is provided at the side of one side wall 232 of the base 220 at the side thereof opposite the side at which the other side wall 232 is provided (i.e., is provided at the outer side of one side wall 232 along the transverse direction of the floor wall 222). The circuit board 352 is formed in the shape of a flat plate, and is fixed integrally to the aforementioned one side wall 232 by a fastening mechanism such as unillustrated screws or the like.

A permanent magnet 354 is fixed to one thickness direction surface of the circuit board 352, i.e., to the surface at the side facing the side wall 232 when the circuit board 352 is fixed to the side wall 232. The permanent magnet 354 is fixed to a vicinity of the lower edge of the circuit board 352 and at the tongue plate insertion opening 218 side, when the direction in which the side walls 232 stand erect with respect to the floor wall 222 is considered to be the vertical direction.

Figure 4:
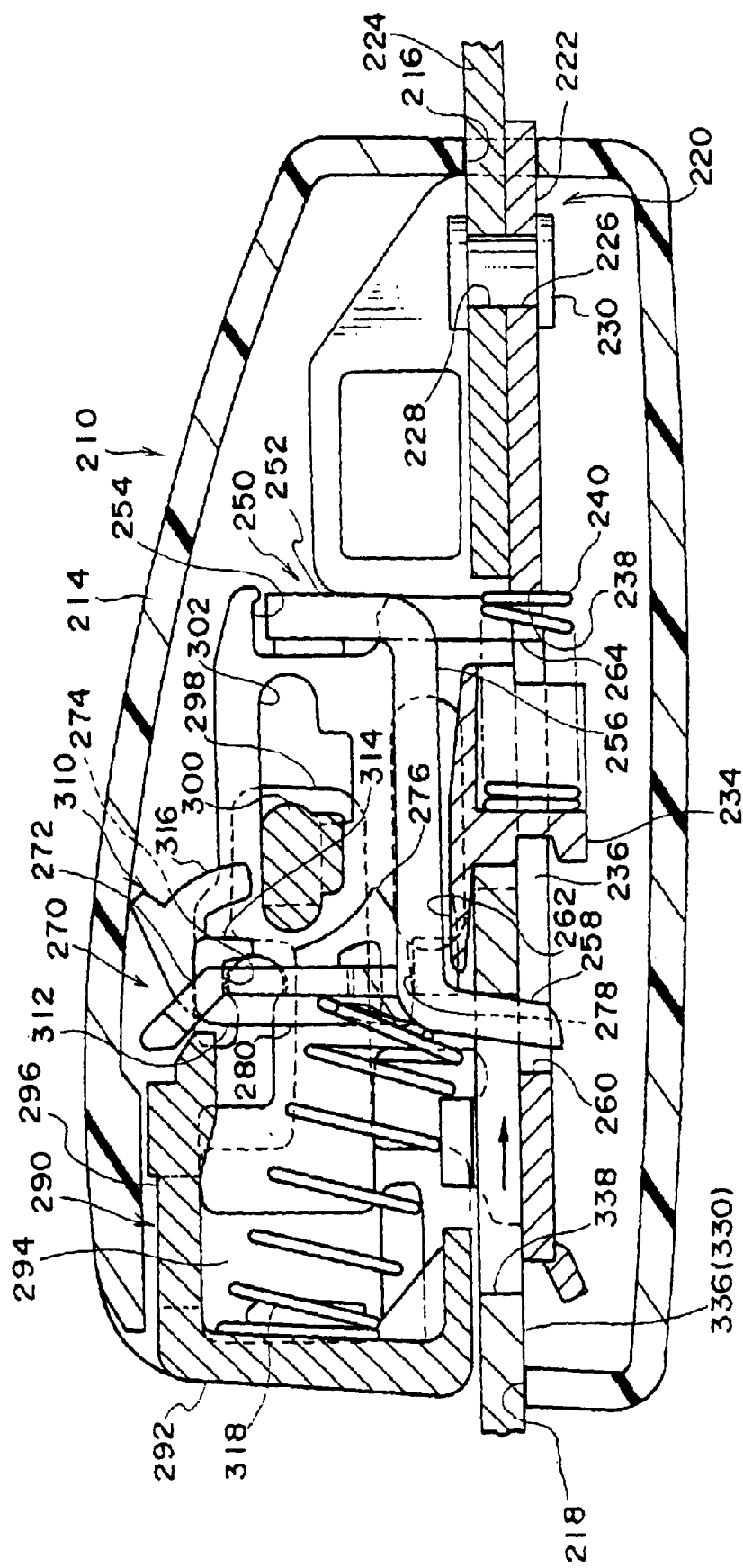
FIG. 4 is a side sectional view corresponding to FIG. 3 and showing a state in which a latch has moved to an engagement position.
Figure 5:
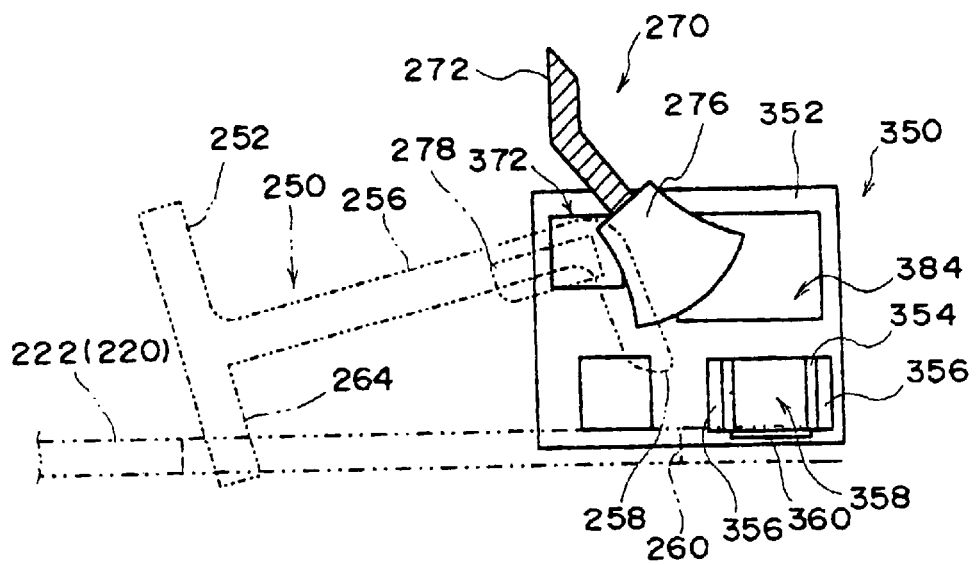
FIG. 5 is a schematic side view, as seen from the side opposite FIG. 3, showing a state in which the latch is positioned at an engagement released position.
Figure 6:
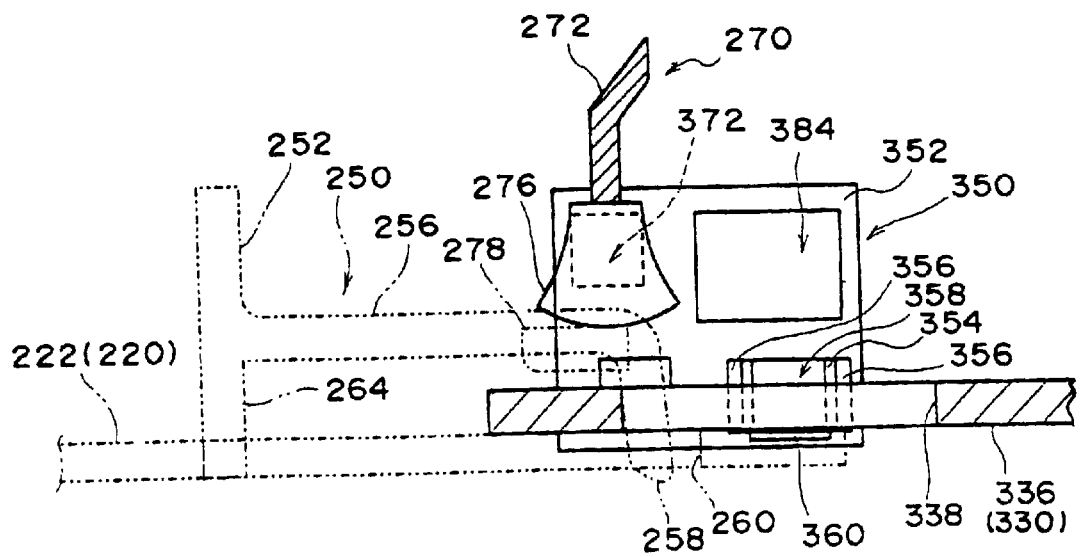
FIG. 6 is a side view corresponding to FIG. 5 and showing a state in which a tongue plate has been inserted and the latch has moved to the engagement position.

The mounted position of the permanent magnet 354 at the circuit board 352 and the mounted position of the circuit board 352 with respect to the side wall 232 are set such that the permanent magnet 354 is positioned at the side of the tongue plate 330 along the transverse direction of the floor wall 222, in the state in which the tongue plate 330 has been inserted in from the tongue plate insertion opening 218 and the latch 250 has moved to the engageable position (the state shown in FIGS. 4 and 6). Further, the polarity of the permanent magnet 354 is such that one side thereof along the longitudinal direction of the floor wall 222 is the north pole and the other side is the south pole.

A pair of magnetic pieces 356 are mounted to the circuit board 352 at the both end portion sides of the permanent magnet 354 along the orientation of the polarity thereof. The magnetic pieces 356 are formed in substantial block shapes from a magnetic metal material such as iron or the like. At the magnetic pieces 356, the dimension thereof along the direction of thickness of the circuit board 352 is greater than that of the permanent magnet 354. In the state in which the magnetic pieces 356 are fixed to the circuit board 352, they project out further toward the side wall 232 than the permanent magnet 354.

Figure 7:
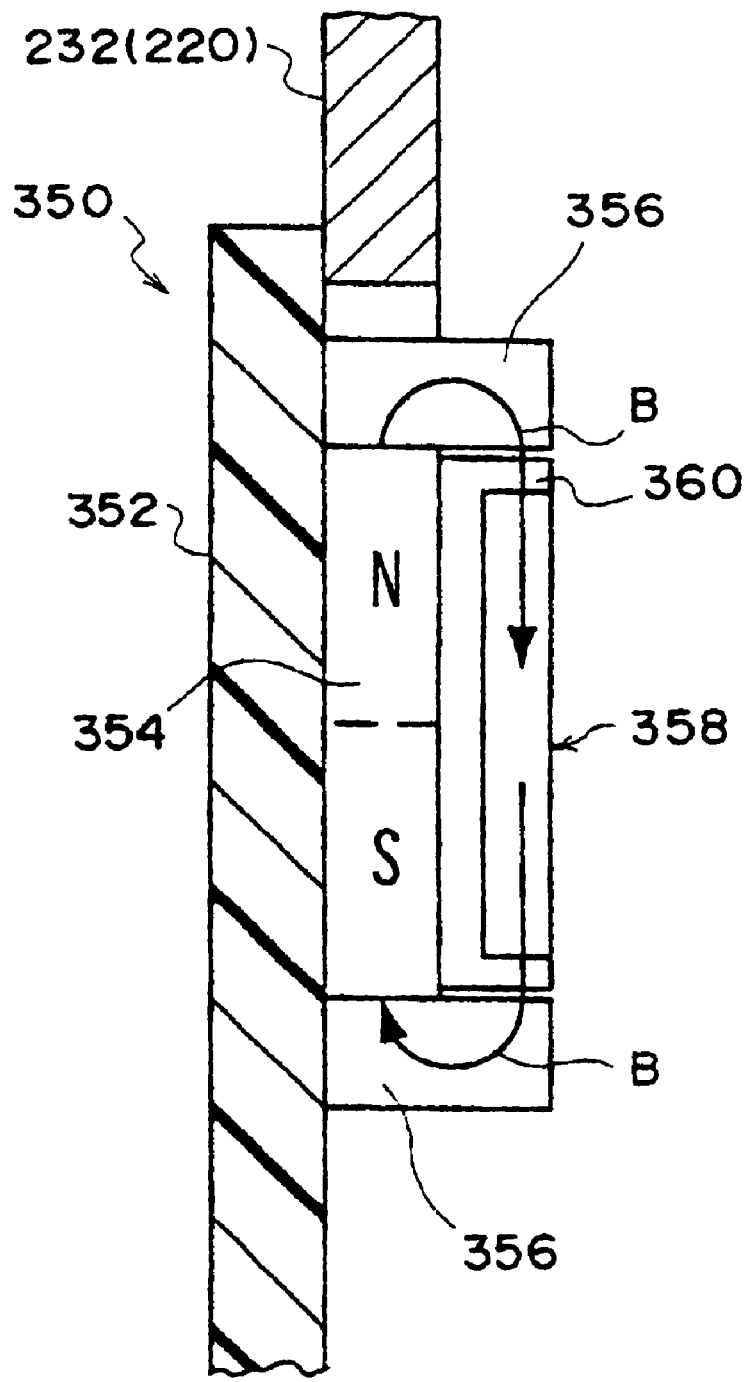
FIG. 7 is a schematic plan view showing a state of a line of magnetic force in a state before a tongue plate is inserted.

These magnetic pieces 356 are not magnetized. However, the magnetic pieces 356 are fixed to the circuit board 352 in a state of contacting the both ends of the permanent magnet 354 along the orientation of the polarity thereof. Therefore, a line of magnetic force B, which arises at the permanent magnet 354, passes through the interiors of the magnetic pieces 356 (see FIG. 7).

On the other hand, a tongue plate detecting portion 358 serving as a first detecting mechanism is provided between the pair of magnetic pieces 356 at the side of the permanent magnet 354 opposite the side at which the circuit board 352 is provided. The lower end portion of the tongue plate detecting portion 358 (i.e., the end portion at the lower side in the vertical direction in the state in which the circuit board 352 is fixed to the side wall 232) is supported by a supporting piece 360 which is fixed to the circuit board 352. Moreover, the tongue plate detecting portion 358 is separated from the permanent magnet 354 in the direction of thickness of the circuit board 352.

As shown in the circuit diagram of FIG. 10, the tongue plate detecting portion 358 has a magnetic sensor 364 which is structured by four giant magnetoresistive elements 362A, 362B, 362C, 362D (hereinafter collectively called "GMR elements 362A through 362D") being connected in the form of a bridge.

As is generally known, the phenomenon in which electrical resistivity increases due to the application of a magnetic field is called the magnetoresistance effect. The rate of change in electrical resistance due to the general magnetoresistance effect is several percent. In contrast, the magnetoresistance effect in which the rate of change in electrical resistance is several ten percent is called the giant magnetoresistance effect. The GMR elements 362A through 362D are electronic parts utilizing this giant magnetoresistance effect, and have structures in which, for example, a thin film of a ferromagnetic metal and a thin film of a non-magnetic or an antiferromagnetic metal are layered alternately. Note that, in the present embodiment, it suffices for the GMR elements 362A through 362D to be electronic parts whose electrical resistance values end up changing due to the giant magnetoresistance effect. The GMR elements 362A through 362D are not to be limited by the material and detailed structure thereof, nor by the specific phenomenon for generating giant magnetic resistance, or the like.

Figure 10:
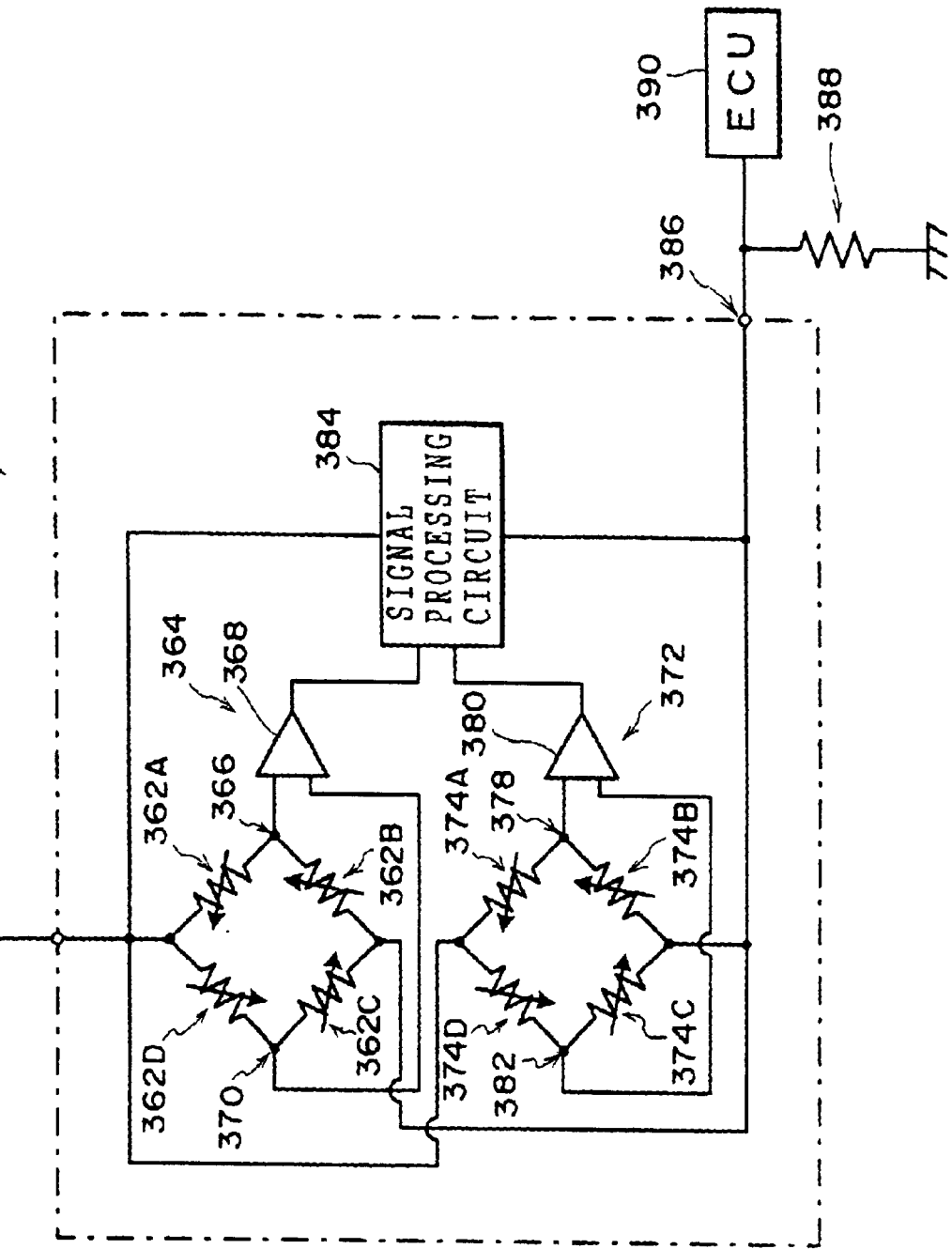
FIG. 10 is a circuit diagram showing the basics of the circuit structure of the lock detecting device of FIG. 9.

As shown in the circuit diagram of FIG. 10, a contact 366 between the GMR element 362A and the GMR element 362B is connected to an input terminal of a comparator circuit 368. A contact 370 between the GMR element 362C and the GMR element 362D is connected to another input terminal of the comparator circuit 368. In this way, the voltage at the contact 366 and the voltage at the contact 370 are compared at the comparator circuit 368.

In addition, when the voltages outputted from the contacts 366, 370 are inputted to the comparator circuit 368 in the state in which the line of magnetic force B of the permanent magnet 354 greatly traverses the magnetic sensor 364 (see FIG. 7 for one example), the comparator circuit 368 outputs a tongue plate detection signal Ts as a first detection signal having an electrical current value of a "low" level. In contrast, when the line of magnetic force B traversing the GMR elements 362A through 362D is reduced, the electrical resistance values of the respective GMR elements 362A through 362D vary. In this way, when the balance among the electrical resistance values of the bridge circuit formed by the GMR elements 362A through 362D breaks down, the comparator circuit 368 outputs a tongue plate detection signal Ts of a "high" level having an electrical current value which is higher than that of the "low" level tongue plate detection signal Ts.

On the other hand, as shown in FIG. 9, a latch detecting portion 372, which serves as a restricting member detecting mechanism or a second detecting mechanism, is provided at the circuit board 352. The above-described tongue plate detecting portion 358 is disposed approximately in a vicinity of the lower edge of the circuit board 352 and at the tongue plate insertion opening 218 side, whereas the latch detecting portion 372 is disposed at the upper edge side of the circuit board 352 and at the anchor insertion opening 216 side. Further, the latch detecting portion 372 is provided so as to be positioned at the side of the lock piece 276 formed by a permanent magnet along the transverse direction of the floor wall 222, in a state in which the lock member 270 has moved to the abutment position.

As shown in the circuit diagram of FIG. 10, the latch detecting portion 372 has a magnetic sensor 376 which is structured by four giant magnetoresistive elements 374A, 374B, 374C, 374D (hereinafter collectively called "GMR elements 374A through 374D") being connected in the form of a bridge. A contact 378 between the GMR element 374A and the GMR element 374B is connected to an input terminal of a comparator circuit 380. A contact 382 between the GMR element 374C and the GMR element 374D is connected to another input terminal of the comparator circuit 380. In this way, the voltage at the contact 378 and the voltage at the contact 382 are compared at the comparator circuit 380.

In addition, when the voltages outputted from the contacts 378, 382 are inputted to the comparator circuit 380 in the state in which the line of magnetic force greatly traverses the magnetic sensor 376, the comparator circuit 380 outputs a latch detection signal Rs as a second detection signal having an electrical current value of a "low" level. In contrast, when the line of magnetic force traversing the GMR elements 374A through 374D is reduced, the electrical resistance values of the respective GMR elements 374A through 374D vary. In this way, when the balance among the electrical resistance values of the bridge circuit formed by the GMR elements 374A through 374D breaks down, the comparator circuit 380 outputs a latch detection signal Rs of a "high" level having an electrical current value which is higher than that of the "low" level latch detection signal Rs.

Note that, even if the latch detection signal Rs is "low" level, the signal level (the electrical current value) of the latch detection signal Rs is higher than that of the tongue plate detection signal Ts which is "high" level.

As shown in FIG. 9, a signal processing circuit 384 is provided at the circuit board 352. As shown in FIG. 10, the signal processing circuit 384 is connected to the comparator circuits 368, 380. The tongue plate detection signal Ts outputted from the comparator circuit 368 and the latch detection signal Rs outputted from the comparator circuit 380 are inputted to the signal processing circuit 384.

Figure 11:
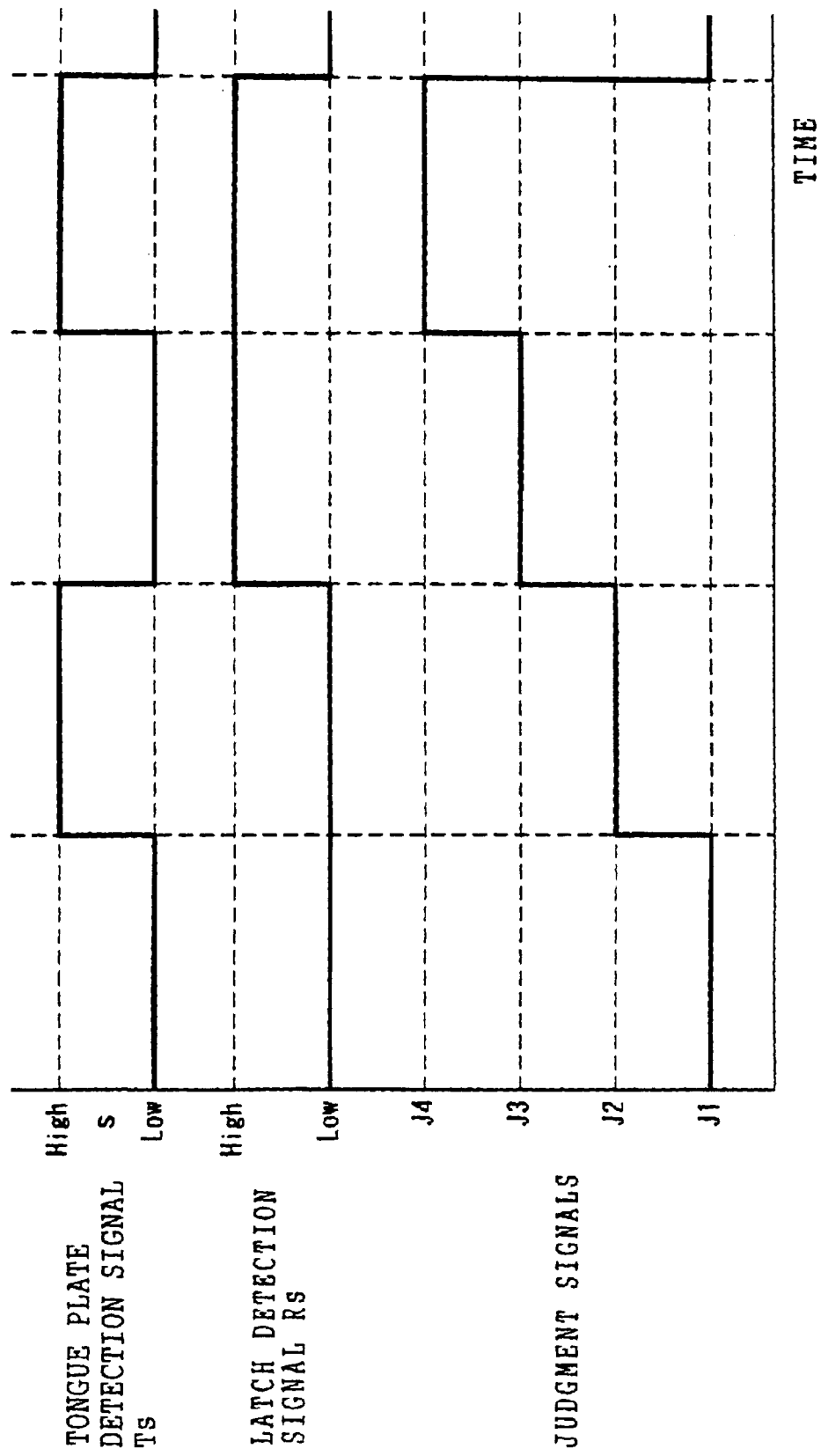
FIG. 11 is a chart showing the relationship between a tongue plate detection signal (a first detection signal) and a latch detection signal (a second detection signal), and judgment signals outputted from a signal processing circuit.

The signal processing circuit 384 judges whether the respective signal levels (electrical current values) of the inputted tongue plate detection signal Ts and latch detection signal Rs are "low" level or "high" level. On the basis of the results of this judgment, the signal processing circuit 384 outputs four types of judgment signals J1, J2, J3, J4 having respectively different electrical current values (signal levels) as shown in FIG. 11.

Specifically, in a case in which both the tongue plate detection signal Ts and the latch detection signal Rs inputted to the signal processing circuit 384 are "low" level, the signal processing circuit 384 outputs the judgment signal J1 which has an electrical current value (signal level) of about 1 mA (1 milliampere). In a case in which the tongue plate detection signal Ts inputted to the signal processing circuit 384 is "high" level and the latch detection signal Rs is "low" level, the signal processing circuit 384 outputs the judgment signal J2 which has a signal level (electrical current value) which is higher than that of the judgment signal J1.

In addition, in a case in which the tongue plate detection signal Ts inputted to the signal processing circuit 384 is "low" level and the latch detection signal Rs is "high" level, the signal processing circuit 384 outputs the judgment signal J3 which has a signal level (electrical current value) which is higher than that of the judgment signal J2. Further, in a case in which both the tongue plate detection signal Ts and the latch detection signal Rs inputted to the signal processing circuit 384 are "high" level, the signal processing circuit 384 outputs the judgment signal J4 whose signal level (electrical current value) is higher than that of the judgment signal J3 and whose electrical current value is about 10 mA (10 milliamperes).

As shown in FIG. 10, the signal processing circuit 384 is connected to a contact 386. The contact 386 is grounded via a resistor 388, and is electrically connected to an ECU 390. In this way, due to the contact 386 being grounded via the resistor 388, the judgment signals J1 through J4 are converted to judgment signals Jv of voltages corresponding to the electrical current values thereof, and the judgment signals Jv are inputted to the ECU 390.

An electrical circuit, and a control mechanism for making electrical current flow to the electrical circuit, and the like are set at the electrical circuits on the circuit board 352 in order for electrical current to flow even in a state in which, for example, the engine of the vehicle is stopped, or a state in which the ignition key has been pulled-out from the key cylinder for activating the engine of the vehicle.

The ECU 390 is electrically connected to an unillustrated indicator provided, for example, at the instrument panel of the vehicle. When the judgment signal Jv corresponding to the judgment signal J4 is inputted to the ECU 390, the indicator, which had been lit until then, is turned off.

Note that, in the present embodiment, the aforementioned indicator is connected to the ECU 390. However, for example, when the present buckle device 210 structures the seat belt device corresponding to the front passenger's seat of the vehicle, the ECU 390 may be connected to a control device of the air bag device for the front passenger's seat.

Operation and Effects of the Present Embodiment

Hereinafter, the operation and effects of the present embodiment will be described.

Basic Operation of Buckle Device 210

In the present buckle device 210, in the state shown in FIG. 3 in which the tongue plate 330 is not attached to the buckle device 210, when the insertion plate portion 336 of the tongue plate 330 is inserted in from the tongue plate insertion opening 218 of the case 214, the distal end portion of the insertion plate portion 336 abuts and pushes the end portion of the ejector 234. Moreover, the tongue plate 330 slides the ejector 234 toward the one longitudinal direction end side of the floor wall 222 against the urging force of the compression coil spring 240.

When the ejector 234 is slid by a predetermined amount, the state in which the placement piece 262 of the ejector 234 and the engaging piece 258 of the latch 250 oppose one another is canceled, and the stoppers 264 of the latch 250 are pushed by the ejector 234. In this way, the latch 250 rotates from the engagement released position to the engagement position, and the distal end portion of the engagement piece 258 moves to approach the floor wall 222.

Further, in this state, the through-hole 338 of the insertion plate portion 336 and the through-hole 260 formed in the floor wall 222 overlap one another. Accordingly, in this state, as shown in FIG. 4, the engaging piece 258 which has rotated passes through the through-hole 338 of the insertion plate portion 336 and the through-hole 260 of the floor wall 222.

Moreover, due to the latch 250 rotating to the engagement position, the state in which the engagement piece 258 of the latch 250 and the abutment portion 280 of the lock member 270 abut one another is canceled. Here, the lock pieces 276 receive the urging force of the compression coil spring 318 via the stopper 310. Therefore, the lock member 270 rotates from the abutment canceled position to the abutment position due to the urging force of the compression coil spring 318 and interlockingly with the rotation of the latch 250. In this way, the lock pieces 276 abut the abutment pieces 278 of the latch 250 from above in FIG. 4, and rotation of the latch 250 in the direction in which the engagement piece 258 moves away from the floor wall 222 is restricted, and the tongue plate 330 is in a state of being attached to the buckle device 210.

If this attached state of the tongue plate 330 is an attached state of the tongue plate 330 after the webbing belt 340 has been pulled-out so as to be positioned in front of the vehicle occupant seated on the seat, this is a "human body restraining state" of the webbing belt 340, and the webbing belt 340 restrains the vehicle occupant.

Operation and Effects of Lock Detecting Device 350

In the state in which the tongue plate 330 is inserted in the case 214 to the position at which the engaging piece 258 of the latch 250 can pass through the through-hole 338 of the tongue plate 330, the tongue plate detecting portion 358, the permanent magnet 354, and the magnetic pieces 356 are positioned at the side of the insertion plate portion 336 (the tongue plate 330) along the transverse direction of the floor wall 222. As described above, the line of magnetic force B generated from the north pole of the permanent magnet 354 passes through the interior of the magnetic piece 356 adjacent to the north pole of the permanent magnet 354 and traverses the GMR elements 362A through 362D of the tongue plate detecting portion 358, and thereafter, passes through the interior of the magnetic piece 356 adjacent to the south pole of the permanent magnet 354 and returns to the south pole of the permanent magnet 354 (see FIG. 7).

Figure 8:
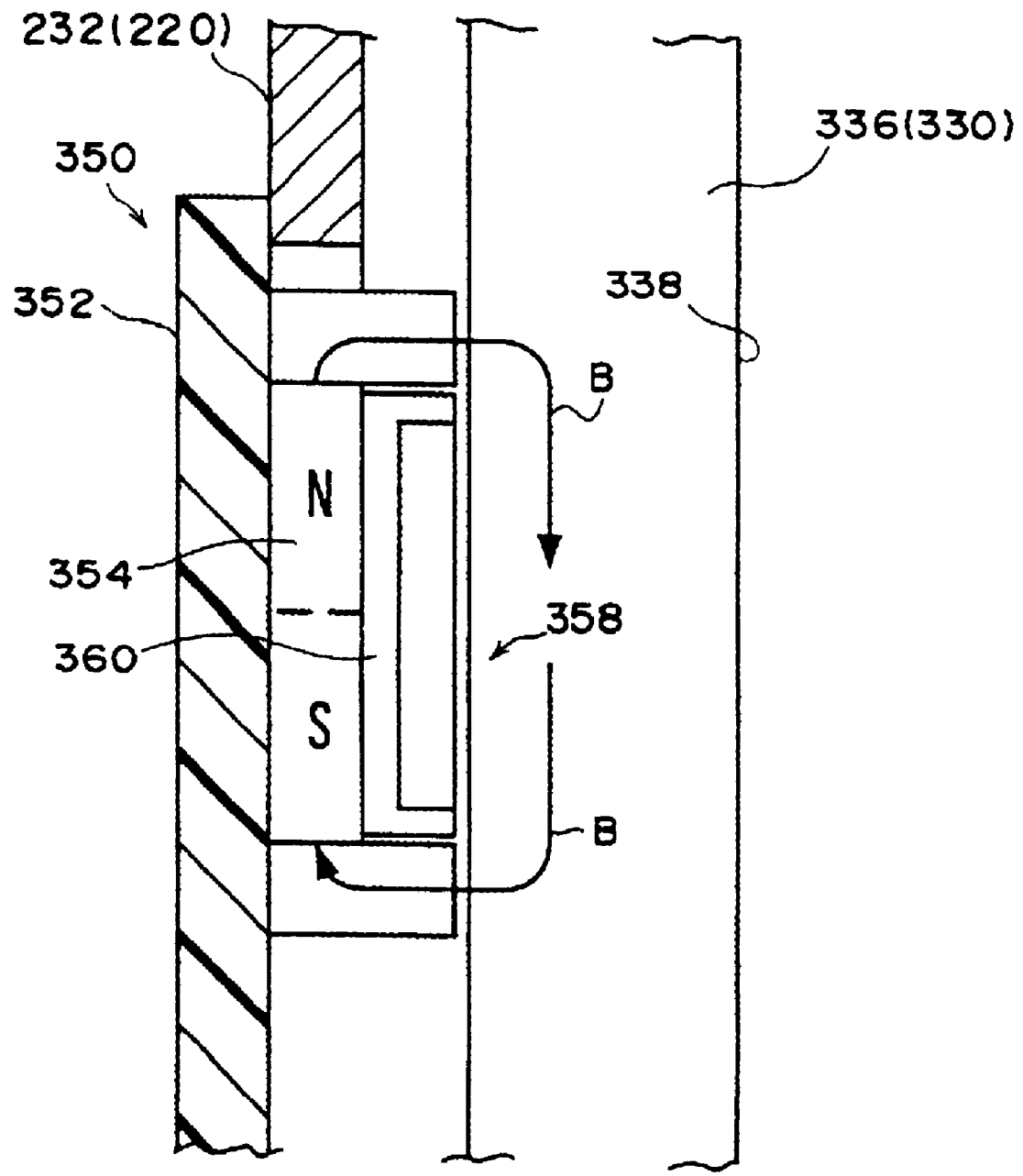
FIG. 8 is a schematic plan view corresponding to FIG. 7 and showing a state in which the tongue plate has been inserted.

Here, as shown in FIG. 6, when the insertion plate portion 336 of the tongue plate 330 which is formed of a magnetic body is positioned at the side of the tongue plate detecting portion 358, as shown in FIG. 8, the line of magnetic force B, which heads from the magnetic piece 356 adjacent to the north pole of the permanent magnet 354 toward the magnetic piece 356 adjacent to the south pole of the permanent magnet 354, heads toward the insertion plate portion 336 of the tongue plate 330 which is formed of a magnetic body having a high magnetic permeability, and after passing through the insertion plate portion 336, heads toward the magnetic piece 356 adjacent to the south pole of the permanent magnet 354. Accordingly, due to the insertion plate portion 336 being positioned at the side of the tongue plate detecting portion 358, the line of magnetic force B traversing the magnetic sensor 364 is reduced or disappears.

When the line of magnetic force B traversing the magnetic sensor 364 is reduced or disappears in this way, the respective electrical resistance values of the GMR elements 362A through 362D vary. The balance among the electrical resistance values of the bridge circuit structured by the GMR elements 362A through 362D thereby breaks down, and the voltage values at the contacts 366, 370 vary. In this way, when the voltage values at the contacts 366, 370 vary, the signal level (electrical current value) of the tongue plate detection signal Ts outputted from the comparator circuit 368 switches from "low" level to "high" level, and the "high" level tongue plate detection signal Ts is inputted to the signal processing circuit 384.

Moreover, as shown in FIG. 4, when the engaging piece 258 moves to the position at which it can pass through the through-hole 338 of the tongue plate 330, and the latch 250 rotates from the engagement released position to the engagement position, and, interlockingly therewith, the lock member 270 rotates from the abutment canceled position to the abutment position, as shown in FIG. 6, the lock piece 276 formed by a permanent magnet opposes the latch detecting portion 372 along the transverse direction of the floor wall 222. In this way, when the line of magnetic force generated from the permanent magnet forming the lock piece 276 traverses the magnetic sensor 376 due to the lock piece 276 formed by a permanent magnet approaching and opposing the latch detecting portion 372, the respective electrical resistance values of the GMR elements 374A through 374D structuring the magnetic sensor 376 vary. In this way, the balance among the electrical resistance values of the bridge circuit structured by the GMR elements 374A through 374D breaks down, and the voltage values at the contacts 378, 382 vary.

In this way, when the voltage values at the contacts 366, 370 vary, the signal level (electrical current value) of the latch detection signal Rs outputted from the comparator circuit 380 switches from "low" level to "high" level, and a "high" level latch detection signal Rs is inputted to the signal processing circuit 384.

When a "high" level tongue plate detection signal Ts and a "high" level latch detection signal Rs are inputted to the signal processing circuit 384, the judgment signal J4 is outputted from the signal processing circuit 384. Here, as shown in FIG. 11, the signal level of the judgment signal J4 is high as compared with those of the judgment signals J1 through J3 which are outputted from the signal processing circuit 384 when the signal level of at least one of the tongue plate detection signal Ts and the latch detection signal Rs is "low" level. Therefore, as compared with cases in which the judgment signals J1 through J3 are outputted, the voltage value of the judgment signal Jv inputted to the ECU 390 is high.

At the ECU 390, it is judged that the tongue plate 330 has been inserted in the case 214 to a position at which engagement of the latch 250 is possible. Simultaneously, it is judged that the lock member 270 has rotated from the abutment canceled position to the abutment position, i.e., that the latch 250 has rotated from the engagement released position to the engagement position. On the basis thereof, it is judged that the latch 250 has engaged with the tongue plate 330. In this way, the indicator, which had been lit until now, is turned off, and the vehicle occupant can recognize that the seat belt is reliably applied to him/her.

Here, in the present buckle device 210, in a case in which the tongue plate 330 is not inserted in the case 214, or the tongue plate 330 has not reached the position at which engagement of the latch 250 is possible even if the tongue plate 330 has been inserted in the case 214, the signal level (electrical current value) of the tongue plate detection signal Ts outputted from the comparator circuit 368 is maintained as is at the "low" level.

On the other hand, if the latch 250 has not rotated to the engagement position, the lock member 270 cannot rotate to the abutment position. Therefore, if the latch 250 is not rotated to the engagement position, the signal level (electrical current value) of the latch detection signal Rs outputted from the comparator circuit 380 is maintained at a "low" level.

Therefore, even if the latch 250 is rotated to the engagement position, if the tongue plate 330 is not inserted to the position within the case 214 at which engagement of the latch 250 is possible, the judgment signal J4 is not outputted from the signal processing circuit 384, and the judgment signal J3 whose signal level is lower than that of the judgment signal J4 is outputted.

Further, even if the tongue plate 330 is inserted to the position within the case 214 at which engagement of the latch 250 is possible, if the latch 250 has not rotated to the engagement position and engaged with the tongue plate 330, the judgment signal J4 is not outputted from the signal processing circuit 384, and the judgment signal J2 whose signal level is lower than that of the judgment signal J4 is outputted.

Therefore, in the present buckle device 210, due to the judgment signal Jv corresponding to the judgment signal J4 being inputted to the ECU 390, the ECU 390 can judge that the tongue plate 330 has been inserted in the case 214 to the position at which engagement of the latch 250 is possible and that the latch 250 has engaged with the tongue plate 330. In this way, so-called "false latching" in which the latch 250 is not engaged with the tongue plate 330 even if the tongue plate 330 is inserted to the position within the case 214 at which engagement of the latch 250 is possible, or the like is not erroneously judged to be engagement of the latch 250 with the tongue plate 330.

Moreover, at the present buckle device 210, the magnetic sensors 364 and 376 are structured by the GMR elements 362A through 362D and 374A through 374D. Even if these GMR elements 362A through 362D and 374A through 374D are replaced with ordinary magnetoresistive elements (MREs), the same operation takes place and the same effects can be achieved.

However, as described above, with ordinary magnetoresistive elements, the rate of change in the electrical resistance at the time when a magnetic field is applied is several percent, whereas with giant magnetoresistive elements (the GMR elements 362A through 362D and 374A through 374D), the rate of change in the electrical resistance at the time when a magnetic field is applied rises to several ten percent. Thus, even if the change in the magnetism of the magnetic field formed by the permanent magnet 354 or the lock piece 276 formed by a permanent magnet is small, the change in the voltage value inputted to the comparator circuit 368, 380 can be made to be large.

In this way, it is possible to reliably detect that the tongue plate 330 has been inserted to the position within the case 214 at which engagement of the latch 250 is possible, and that the latch 250 has rotated to the engagement position.

As described above, at the present buckle device 210, the tongue plate detecting portion 358 formed so as to include the magnetic sensor 364, the latch detecting portion 372 formed so as to include the magnetic sensor 376, and the signal processing circuit 384 are mounted to the same circuit board 352. Therefore, the tongue plate detecting portion 358, the latch detecting portion 372, and the signal processing circuit 384 can be assembled to the base 220 (i.e., the device main body) merely by mounting the circuit board 352 to one of the side walls 232 of the base 220. Thus, as compared with a structure in which, after the tongue plate detecting portion 358, the latch detecting portion 372, and the signal processing circuit 384 are respectively assembled to the base 220, they are connected, the number of processes required for the assembly work can be decreased. As a result, the manufacturing cost of the present buckle device 210 can be made to be less expensive.

Further, the tongue plate detection signal Ts and the latch detection signal Rs outputted from the comparator circuits 368, 380 are inputted to the signal processing circuit 384, and the judgment signals J1 through J4 are outputted from the signal processing circuit 384. Therefore, it suffices for the signal input terminals of the signal processing circuit 384 to be connected only to the output terminals of the comparator circuits 368, 380. The wiring with respect to the signal processing circuit 384 can thereby be simplified.

Moreover, as described above, at the present buckle device 210, electrical current always flows to the circuits on the circuit board 352. Therefore, in a case such as when the judgment signals J1 through J4 are not outputted at all, it can be thought that some type of abnormality has arisen at the electronic parts or the wiring or the like provided on the circuit board 352, such as the tongue plate detecting portion 358, the latch detecting portion 372, the signal processing circuit 384 and the like. Accordingly, in a case in which no judgment signal Jv corresponding to any of the judgment signals J1 through J4 is inputted to the ECU 390, the ECU 390 can inform the vehicle occupant of the aforementioned abnormality by, for example, lighting an indicator provided at the instrument panel of the vehicle.

In the present embodiment, in the state in which the tongue plate 330 is not inserted in the case 214, the "low" level tongue plate detection signal Ts is outputted from the comparator circuit 368. In a case in which the insertion plate portion 336 of the tongue plate 330 is positioned at the side of the tongue plate detecting portion 358, the "high" level tongue plate detection signal Ts is outputted from the comparator circuit 368. However, this is merely an example. For example, in the state in which the tongue plate 330 is not inserted in the case 214, the "high" level tongue plate detection signal Ts may be outputted from the comparator circuit 368, and when the insertion plate portion 336 of the tongue plate 330 is positioned at the side of the tongue plate detection portion 358, the "low" level tongue plate detection signal Ts may be outputted from the comparator circuit 368.

Moreover, in the present embodiment, when the latch 250 is at the engagement released position, the "low" level latch detection signal Rs is outputted from the comparator circuit 380, and when the latch 250 is at the engagement position, the "high" level latch detection signal Rs is outputted. However, when the latch 250 is at the engagement released position, the "high" level latch detection signal Rs may be outputted from the comparator circuit 380, and when the latch 250 is at the engagement position, the "low" level latch detection signal Rs may be outputted.

In addition, in the present embodiment, the signal processing circuit 384 outputs the judgment signals J1 through J4 whose electrical current values are respectively different. However, it suffices for the judgment signals outputted from the signal processing circuit 384 to be such that four types of judgment signals which can be differentiated from one another are outputted in accordance with the respective signal levels of the tongue plate detection signal Ts outputted from the comparator circuit 368 and the latch detection signal Rs outputted from the comparator circuit 380.

Figure 12:
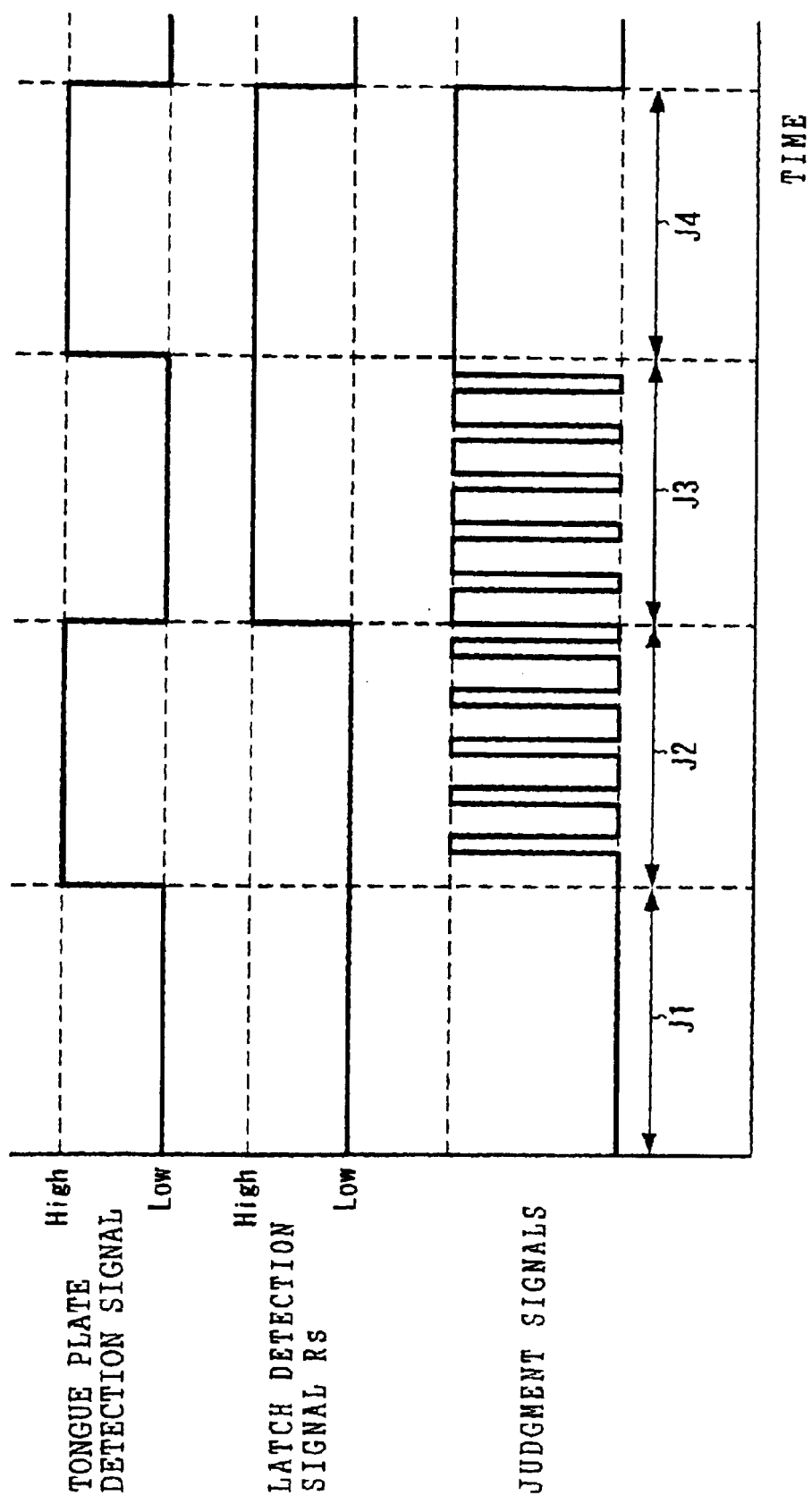
FIG. 12 is a chart showing another example of the relationship between the tongue plate detection signal (the first detection signal) and the latch detection signal (the second detection signal), and the judgment signals outputted from the signal processing circuit.

Accordingly, for example, the following structure is possible: the electrical current values of the judgment signals J1 through J4 do not differ. As shown in FIG. 12, a signal, in which electrical current of an electrical current value IL is continuous, is the judgment signal J1. A signal, in which electrical current of the electrical current value IL flows in the form of a rectangular wave at constant time intervals between times when electrical current of an electrical current value IH, which is higher than the electrical current value IL, is flowing, is the judgment signal J2. Conversely, a signal, in which electrical current of the electrical current value IH flows in the form of a rectangular wave at constant time intervals between times when electrical current of the electrical current value IL is flowing, is the judgment signal J3. A signal, in which electrical current of the electrical current value IH is continuous, is the judgment signal J4.

Moreover, in the present embodiment, at least the lock piece 276 of the lock member 270 is formed by a permanent magnet. However, a permanent magnet may be separately fixed to the lock piece 276.

In addition, in the present embodiment, the latch detecting portion 372 indirectly detects the rotation of the latch 250 by detecting the rotation of the lock piece 276. However, for example, at least a portion of the connecting portion 256 or the engaging piece 258 of the latch 250 may be formed by a permanent magnet, or a permanent magnet may be fixed to the connecting portion 256 or the engaging piece 258, such that the latch detecting portion 372 directly detects rotation of the latch 250.

As described above, in the buckle device relating to the present invention, attachment of the tongue plate can be reliably detected on the basis of the results of detection of both whether or not the tongue plate has been inserted into the device main body and whether or not the latch has moved.

What is claimed is:

1. A buckle device comprising:
   a device main body into which is inserted a tongue plate provided at a webbing belt;
   a locking mechanism having a latch which is provided within the device main body so as to be movable between an engagement position, at which the latch engages with the tongue plate which has been inserted in the device main body, and an engagement released position, at which the latch does not engage with the tongue plate, wherein when the latch moves to the engagement position, the latch engages with the tongue plate and restricts pulling-out of the tongue plate from the device main body;
   a first detecting mechanism detecting the tongue plate which has been inserted in the device main body, and outputting a first detection signal in a state in which the first detecting mechanism detects at least the tongue plate;
   a second detecting mechanism selected from one of directly or indirectly detecting the latch which is positioned at either one of the engagement position and the engagement released position, and outputting a second detection signal in a state in which the second detecting mechanism detects at least the latch; and
   a judging mechanism connected to the first detecting mechanism, and, on the basis of the first detection signal from the first detecting mechanism, judging whether or not the tongue plate has been inserted in the device main body, and connected to the second detecting mechanism, and, on the basis of the second detection signal from the second detecting mechanism, judging whether the latch is positioned at the engagement position or the engagement released position.

2. The buckle device of claim 1, wherein the locking mechanism has a restricting member, and the restricting member is provided at an interior of the device main body so as to be interlockingly movable with the latch so as to move from an abutment canceled position, at which the restricting member does not abut the latch, to an abutment position, at which the restricting member abuts the latch, when the latch moves from the engagement released position to the engagement position, and in a state in which the restricting member has moved to the abutment position, the restricting member abuts the latch which has moved to the engagement position, and restricts movement of the latch to the engagement released position.

3. The buckle device of claim 2, wherein the second detecting mechanism has a restricting member detecting mechanism which detects the restricting member positioned at either one of the abutment canceled position and the abutment position, and which outputs a predetermined detection signal in a state in which the restricting member detecting mechanism detects at least the restricting member.

4. The buckle device of claim 1, wherein the first detecting mechanism has:
   a permanent magnet provided at a side of a locus of movement of the tongue plate within the device main body, an orientation of magnetic poles of the permanent magnet running along a direction of movement of the tongue plate within the device main body; and
   a magnetic sensor detecting magnetism of the permanent magnet, and outputting the first detection signal on the basis of changes in detected magnetism.

5. The buckle device of claim 4, wherein the tongue plate is formed by a magnetic body, and the first detecting mechanism is disposed at a side of the tongue plate which is inserted in the device main body.

6. The buckle device of claim 4, wherein the magnetic sensor structuring the first detecting mechanism is formed by a magnetoresistive element.

7. The buckle device of claim 6, wherein the magnetoresistive element is a giant magnetoresistive element.

8. The buckle device of claim 4, wherein the second detecting mechanism includes:
   a permanent magnet provided within the device main body, and moving one of integrally with and interlockingly with movement of the latch; and
   a magnetic sensor provided at a side of the permanent magnet in a state in which the latch is positioned at one of the engagement position and the engagement released position, the magnetic sensor detecting magnetism of the permanent magnet and outputting the second detection signal which is based on changes in detected magnetism.

9. The buckle device of claim 8, wherein the magnetic sensor structuring the second detecting mechanism is formed by a magnetoresistive element.

10. The buckle device of claim 9, wherein the magnetoresistive element is a giant magnetoresistive element.

11. The buckle device of claim 1, further comprising a substrate to which both the first detecting mechanism and the second detecting mechanism are mounted.

12. The buckle device of claim 11, wherein electrical current is always made to flow to electrical circuits including the first detecting mechanism and the second detecting mechanism.

13. A buckle device comprising:
   a device main body into which is inserted a tongue plate provided at a webbing belt;
   a locking mechanism having a latch which is provided within the device main body so as to be movable to a position at which the latch can engage with the tongue plate when the tongue plate is inserted in the device main body, the locking mechanism restricting pulling-out of the tongue plate from the device main body;
   a first detecting mechanism detecting the tongue plate which has been inserted in the device main body, and outputting a first detection signal;
   a second detecting mechanism detecting a position of the latch, and outputting a second detection signal; and
   a judging mechanism connected to the first detecting mechanism and the second detecting mechanism,
   wherein on the basis of the first detection signal, the judging mechanism judges whether or not the tongue plate is inserted in the device main body, and on the basis of the second detection signal, the judging mechanism judges whether or not the latch is engaged with the tongue plate.

14. The buckle device of claim 13, wherein the first detecting mechanism includes:
   a magnet provided at a side of a locus of movement of the tongue plate within the device main body, an orientation of magnetic poles of the magnet running along a direction of movement of the tongue plate within the device main body; and
   a magnetic sensor detecting magnetism of the magnet, and outputting the first detection signal on the basis of changes in detected magnetism.

15. The buckle device of claim 14, wherein the first detecting mechanism is disposed at a side of the tongue plate which is inserted in the device main body.

16. The buckle device of claim 14, wherein the magnetic sensor structuring the first detecting mechanism is formed by a magnetoresistive element.

17. The buckle device of claim 14, wherein the second detecting mechanism includes:
- a magnet provided within the device main body, and moving either integrally with or interlockingly with movement of the latch; and
- a magnetic sensor provided at a side of the magnet in a state in which the latch is positioned at a position of engaging with the tongue plate, the magnetic sensor detecting magnetism of the magnet and outputting the second detection signal which is based on changes in detected magnetism.

18. The buckle device of claim 17, wherein the magnetic sensor structuring the second detecting mechanism is formed by a magnetoresistive element.

19. A method of judging whether or not the tongue plate is attached to the buckle device in the buckle device of claim 17, said method comprising:

judging a high/low level of an electrical current value of each first detection signal outputted on the basis of a state of the tongue plate;

judging a high/low level of an electrical current value of each second detection signal outputted on the basis of a state of the latch when each first detection signal is outputted; and outputting a judgment signal from the judging mechanism on the basis of results of judgment of each first detection signal and each second detection signal corresponding to each first detection signal.

20. The method of judging of claim 19, wherein the judging mechanism judges that the tongue plate is reliably attached to the buckle device when each first detection signal and each second detection signal both have high electrical current values.

* * * * *